United States Patent [19]
Groud

[11] Patent Number: 4,761,016
[45] Date of Patent: Aug. 2, 1988

[54] AUTOMATIC VEHICLE WITH FORWARDLY MOUNTED TOOL ASSEMBLY AND STEERING SYSTEM FOR GUIDING THE TOOL ASSEMBLY

[75] Inventor: Laurent Groud, Hallignicourt, France

[73] Assignee: Champenois S.A., Eurville, France

[21] Appl. No.: 863,827

[22] Filed: May 12, 1986

[30] Foreign Application Priority Data

May 13, 1985 [FR] France ............................ 85 07337

[51] Int. Cl.⁴ ..................... B62D 1/02; A01B 69/08
[52] U.S. Cl. ................................. 280/467; 56/15.5; 172/279
[58] Field of Search ............... 172/810, 278, 279, 280, 172/281; 280/419, 426, 442, 459, 467; 56/15.4, 15.5

[56] References Cited

U.S. PATENT DOCUMENTS

| | | | |
|---|---|---|---|
| 2,612,385 | 9/1952 | Piltz | 280/419 |
| 2,980,443 | 4/1961 | Fina, Jr. | 280/467 |
| 3,669,194 | 6/1972 | Zurek | 280/419 X |

FOREIGN PATENT DOCUMENTS

| | | | |
|---|---|---|---|
| 2631774 | 1/1978 | Fed. Rep. of Germany | 280/419 |
| 870656 | 12/1941 | France | 280/442 |
| 2549794 | 2/1985 | France | 280/419 |
| 57-167874 | 10/1982 | Japan | 280/426 |

*Primary Examiner*—Richard T. Stouffer
*Attorney, Agent, or Firm*—Young & Thompson

[57] ABSTRACT

A system is provided for guiding a tool assembly that extends forwardly from an automotive vehicle. The system comprises a connecting member (7) having one end connected to the tool assembly, and being pivotally mounted to the vehicle frame intermediate its length. The other end of the connecting member (7) is pivotally connected to one end of an auxiliary tie rod (10), and the other end of the tie rod (10) is pivotally connected to one of the arms of the pair of steering knuckles comprising the vehicle's conventional steering system. The tool assembly is thus directed along a trajectory exactly corresponding with the path of the vehicle.

2 Claims, 2 Drawing Sheets

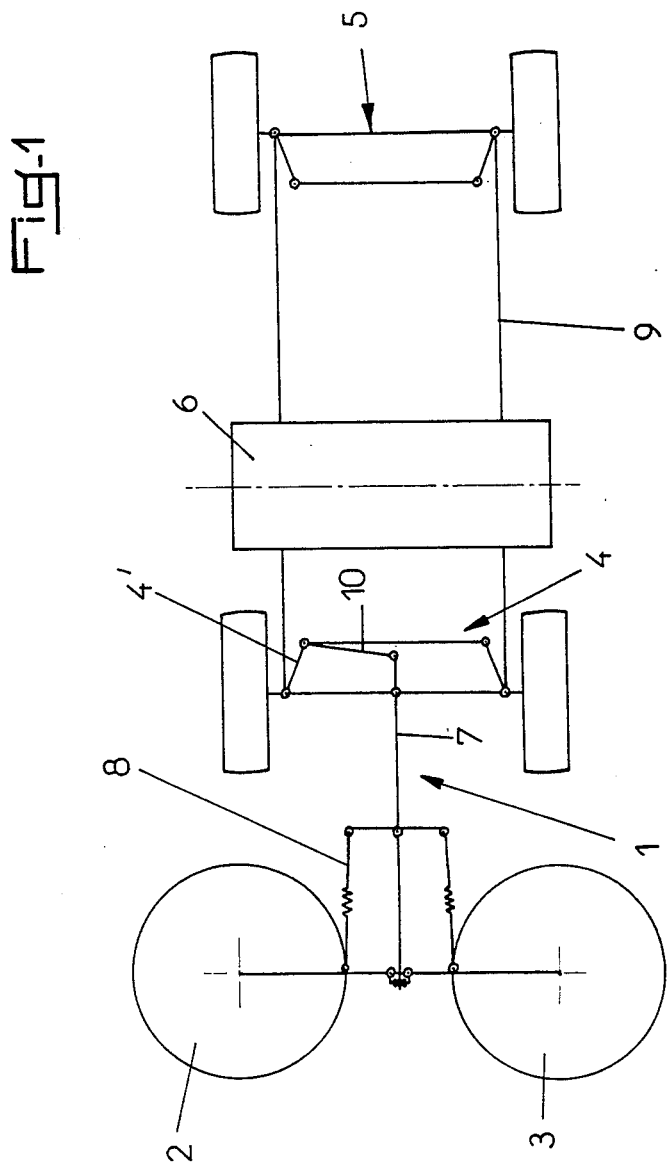

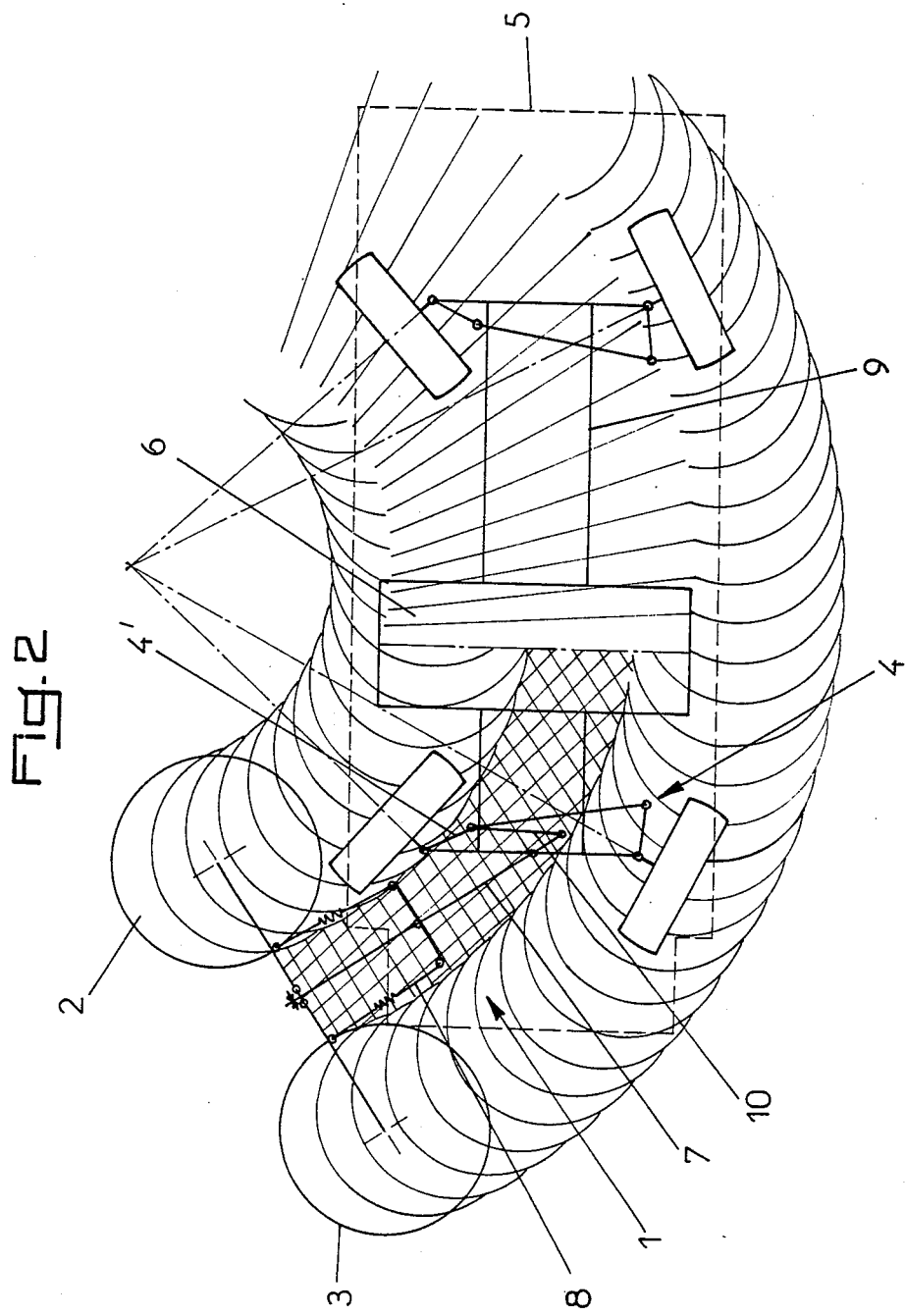

AUTOMATIC VEHICLE WITH FORWARDLY MOUNTED TOOL ASSEMBLY AND STEERING SYSTEM FOR GUIDING THE TOOL ASSEMBLY

The present invention relates to the field of construction of vehicles provided with forwardly or rearwardly overhanging tools, particularly street cleaning sweepers, lawnmowers, trash vacuums, harvesting equipment, snow removing equipment, soil working equipment, ground marking equipment, spraying equipment, floor cleaners and equipment for scattering liquids or solids.

At present, the existing equipment is generally provided with tools fixed to the chassis in frontal position, which do not permit a sufficient manageability of the active part of the tool.

So as to overcome this inconvenience, it has been proposed to provide tools able to be carried laterally by the driver, independently of the direction of motion. Nevertheless, such a method presents the inconvenience of distracting a major part of the attention of the driver for handling the tool, to the detriment of the driving, and thus the retardation of the working speed.

The present invention has as an object to overcome these inconveniences.

It has, in effect, as an object a guiding apparatus for vehicles comprising forwardly or rearwardly overhanging tools operating in frontal position, characterized in that it is provided with a direct connection element between the active part and the steering mechanism of the vehicle.

The invention will be best understood thanks to the following description, which relates to a preferred embodiment, given by way of non-limiting example, and explained with reference to the accompanying schematic drawings, in which:

FIG. 1 is a plan view of a vehicle equipped with an apparatus according to the invention, and FIG. 2 is a plan view of the vehicle showing the trajectories of the tools.

According to the invention, and as shown in FIGS. 1 and 2 of the accompanying drawings, the guiding apparatus for vehicles comprising forwardly or rearwardly overhanging tools operating in frontal position is characterized in that it is provided with an element 1 for direct connection between the active part 2, 3 and the steering mechanism 4 of the vehicle 5.

This element 1 is intended to permit an anticipation of the lateral movement around curves and to facilitate the driving of the vehicle 5 with simultaneous maneuvering of the active part 2, 3.

The active part 2, 3 is constituted in a known manner by tools in frontal position, a similar or different tool 6 being able to be mounted beneath the vehicle 5.

The tools forming the active part 2, 3 as well as the tool 6 may be of any type, for example vertical axis brushes and a horizontal axis brush, this latter being able to be replaced by a vacuum hose collecting the refuse assembly by the frontal brushes, or helical lawnmowing elements or lawnmowing elements having helicoidal blades, or solely vacuum hoses, or also in the form of ramps for distribution of liquid or pulverulent products.

The tool 2 and 3 may similarly be constituted by snow removing apparatus of the snow blade type, or by an apparatus for spraying ground-marking paint for cold application or by hot application and reticulation, or also by an apparatus for removing ground-marking paint.

Finally, the tools 2, 3 and 6 may similarly be in the form of snow removal devices of the snow chopping type.

The element 1 is essentially constituted by an arm 7 fixed to an extremity of the support chassis 8 of the active part 2, 3 connected on the chassis 9 of the vehicle 5 and connected through its other extremity by means of a connecting rod 10, and/or a hydraulic, electromechanical or electronic device, to the steering mechanism 4, preferably to the swivel joint of a steering lever 4'.

Thus, at the time of a change of direction, the arm 7 is pivoted about its articulation point on the chassis 9 in such a manner that the active part 2, 3 exactly follows a trajectory concentric to that of the wheels of the vehicle 5, as is shown in FIG. 2. Moreover, because of this trajectory, the supplementary tool 6 is perfectly adapted to cover the zone which is not worked by the tools 2, 3 of the active part, even on the curbs.

Thanks to the invention, it is possible to realize vehicles comprising perfectly manageable forwardly or rearwardly overhanging tools and which do not require constant surveillance of the active parts to the detriment of the driving. Moreover, the guiding of the overhanging portions in a synchronized manner with the wheels of the vehicle permits a perfect curvature in the zones to be worked.

It will be understood that the invention is not limited to the embodiment described and shown in the accompanying drawings. Modifications remain possible, particularly from the point of view of the construction of the various elements, or by substitution of equivalent techniques, without departing whatsoever from the scope of protection of the invention.

I claim:

1. An automatic vehicle with a tool assembly mounted forwardly thereof and a steering system for guiding the tool assembly
    comprising a pair of steering knuckles each pivotally mounted to a frame of said vehicle, each said knuckle bearing a front wheel of said vehicle and each having an arm pivotally mounted to respectively opposite ends of a first tie rod, and said tool assembly extending forwardly of said vehicle and connected to said vehicle frame, a connecting member (7) having a first end fixed to said tool assembly and being pivotally mounted, intermediate its length, to said vehicle frame at an intermediate pivot point, said tool assembly being laterally movable with respect to said vehicle frame about said intermediate pivot point, and a second tie rod (10) having a first end pivotally mounted to one of said arms of said pair of steering knuckles and a second end pivotally mounted to a second end of said connecting member (7).

2. An automotive vehicle with tool assembly and steering system according to claim 1, wherein said second tie rod (10) extends forwardly with respect to said vehicle from said first tie rod.

* * * * *